United States Patent
Michaels (10) Patent No.: US 6,240,167 B1
(45) Date of Patent: May 29, 2001

(54) TELEPHONE-LINKED COMMODITY-BILLING METHOD

(76) Inventor: Raymond Joseph Michaels, 5 Rock St., Veazie, ME (US) 04401

( * ) Notice: Subject to any disclaimer, the term of this patent is extended or adjusted under 35 U.S.C. 154(b) by 0 days.

(21) Appl. No.: 09/232,959

(22) Filed: Jan. 19, 1999

(51) Int. Cl.$^7$ .................................................. H04M 11/00
(52) U.S. Cl. .............................. 379/106.03; 379/106.06; 379/106.07; 379/106.08; 379/106.11
(58) Field of Search .......................... 379/106.03–106.11, 379/114; 340/870.02, 870.01, 870.05; 324/142

(56) References Cited

U.S. PATENT DOCUMENTS

| | | |
|---|---|---|
| 3,231,670 | 1/1966 | Lane et al. . |
| 3,553,376 | 1/1971 | Bogaart et al. . |
| 3,742,142 | 6/1973 | Martin . |
| 3,937,890 | 2/1976 | Blethen et al. . |
| 4,004,097 | 1/1977 | Spaulding . |
| 4,707,852 | 11/1987 | Jahr et al. . |
| 4,833,618 | 5/1989 | Verma et al. . |
| 5,488,654 * | 1/1996 | Oliver .............................. 379/106.08 |
| 5,528,675 * | 6/1996 | Chen ................................ 379/106.01 |
| 5,590,179 * | 12/1996 | Shincovich et al. ............. 379/106.06 |
| 5,897,607 * | 4/1999 | Jenney et al. ........................... 702/62 |
| 5,994,892 * | 11/1999 | Turino et al. .................... 379/106.03 |
| 6,018,726 * | 1/2000 | Tsumura ................................ 705/412 |

* cited by examiner

Primary Examiner—Duc Nguyen
Assistant Examiner—Barry W Taylor (74) Attorney, Agent, or Firm—Thomas L. Bohan; Patricia M. Mathers (57) ABSTRACT

A method for billing consumers of on-demand commodities consumed at a site remote from the site at which they are produced. It is modeled after certain contemporary telephone-company billing practices, though it is not limited to use with telephone companies. In one embodiment the method uses a telephone service provider to bill and collect for monies owed to the producer of the commodity for the amount of the full commodity units consumed during a billing period. In a simple embodiment of the method, commodity-consumption information is sent to the billing service by an automatically reading meter located at the point where the commodity is delivered for consumption. In particular, this commodity meter—such as an electric power meter—is designed to generate a discrete signal each time that a predetermined commodity-billing-unit has been consumed. Further in this particular embodiment, a coupling device for coupling the meter to the telephone line of the consumer is designed to receive this discrete signal and, each time that it does, to call a predetermined telephone number. The coupling device then disconnects the telephone connection immediately upon receiving verification of a telephone connection, without the transfer of any data. In that manner, the billing facility at the telephone is able to record that the particular customer identified by the number from which the call came had consumed one more billing-cost-unit of the commodity. This information is then utilized by the accounting computer at the telephone company to generate a line item or a billing section on the next telephone bill sent to that particular customer, a line item or a billing section corresponding to the cost of the commodity in question consumed by that customer during the billing period.

22 Claims, 2 Drawing Sheets

TELEPHONE-LINKED COMMODITY-BILLING METHOD

BACKGROUND OF THE INVENTION

1. Field of Invention

The invention relates to the field of automatic remote billing. In particular, the present invention relates to a method for directly converting commodity-consumption data into consumer billing via existing telecommunications systems. More particularly, this invention relates to an automated bill-generation method using existing telecommunications billing systems for remotely generated, automatically delivered commodities and services.

2. Prior Art

A variety of remotely transmitted commodities are provided to a delivery system in bulk, on a continuously available basis, so that individual users of these commodities can consume them in such quantities and at such times as each user's needs may demand. These commodities can be divided into two categories—Category I and Category II, respectively—based on the way in which they are provided and billed for. Category I includes the traditional utilities such as water, gas, electricity, and is characterized in part by the fact that each is continuously available at each individual user's site, at which site the user taps into the commodity. Each Category I commodity is also characterized by the fact that its usage by each user is recorded by a meter at the individual user's site and the consequence that the provider of that commodity must employ human meter readers to periodically visit each of the users' sites in order to collect usage data and then to carry this data back to the provider's site for conversion into billing data. In addition to recording the amount of the commodity used, the meter may also make a record of the times of use, that information to be used, for example, in time-of-use dependent billing.

Each traditional Category I commodity has had its own dedicated delivery means—including, respectively, electric transmission lines, gas lines, and water pipes. However, the proliferation of other transmission means—including AM/FM radio broadcast, and more recently, microwave, satellite, and cable transmission, as well as the increasing use of the World Wide Web—has made possible the delivery in this continuously available manner of a variety of other commodities, such as entertainment and information. These commodities tend to fall into Category II.

Category II commodities can also be continuously available at sites remote from their provider. A significant difference is that when the commodity is demanded by the user, it must at that time be sent out by the provider. (A simple example is the pay-per-view movie sent out to an individual user over a TV cable when the user requests it.) While such on-demand commodities may be "continuously available," their availability is at the source, delivery is made in reaction to a demand from the user to the source, and so monitoring of delivered quantities and delivery times is customarily done at the source, rather than at the point of delivery. In other words, there is no need for the meter readers; billing data is from the outset located at the provider's site. Thus the remotely provided, continuously available commodities making up Category II are much more convenient to their provider, in terms of accounting and billing, and generally less expensive in terms of overhead. On the other hand, the requirement that the user undertake a specific initiation-action separate from simply starting to use the commodity (as one would do with Category I commodities) and the concomitant uncertainty of commodity accessibility at the time the initiation-action is taken makes the consumption of Category II commodities less convenient for the user. It is desirable to provide the ease-of-consumption of Category I commodities with something approaching the efficiency of billing of Category II commodities.

A survey of the prior art reveals many attempts to improve the efficiency of billing for Category I commodities. These attempts all incorporate to one degree or another automatically reading meters for collecting and storing consumption data in machine-readable form, consumption data that is then transferred to the provider's central location, by means of a traditional meter-reader carrying a data-collection device or by more automatic means. Once collected and transferred to the provider's site, these data still must be manipulated in various ways to generate customer billing. For example, one of the earliest of these methods is described by Lane et al. (U.S. Pat. No. 3,231,670; issued in 1966). Lane et al. employs a meter-coupling device capable of generating audio tones, the combination and frequency of which indicate the needle position of each of the dials of the meter that is periodically polled by the provider. The more common automatically reading meter in use today, however, is of the type described by Bogaart et al. (U.S. Pat. No. 3,553,376; issued in 1971). Meters of the Bogaart et al. type generate an electronic pulse for each incremental unit of consumption detected by the meter, which uses the pulses to continually update the accumulated total usage stored at the user location, either in the meter itself or in some associated device. Some of these counting-and-storing meters have the facility to also record time and/or time-of-use data. Some such meters continue to display the usage data on mechanical dials, while others display the data on digital readout displays. In any event, the total usage stored by the meter is then collected by a meter reader with a data collector device that plugs into the usage-storage device at the user's site.

All of the automatically reading prior-art meters store usage data in the form of the total number of units—be it units of the commodity consumed or monetary units, which may depend jointly on the amount consumed and the time at which it was consumed—that have accumulated since the time that the connection was made and the meter activated. Thus, when the data are transferred to the commodity provider, that provider must then determine usage for the current billing period by subtracting from the latest reading the reading at the end of the previous billing period. Although this accounting and billing method is firmly rooted in long-standing common practice, it is archaically cumbersome, requiring periodic calculations dependent on the maintenance of a base of historical data. Furthermore, each such Category I continuously available commodity demands its own proprietary accounting and billing system and related historical data storage system, the maintenance of which is burdensome and expensive.

Even with the inefficiencies noted, the automatically reading meters are beneficial in that they eliminate the source of human error that existed when meters were read visually and recorded manually. This is indeed a strength and represents a significant advance over the earlier tradition that demanded maximum human intervention in the collection of commodity usage-data.

The next step after the introduction of automatic storage of usage data was the idea of automated usage-data collection without the need of a human meter reader traveling to the user's location. The prior art, including Lane et al. and Bogaart et al., discloses two general types of remote automatic-meter-reading systems using automatically reading meters. Both generally rely on the transmission of meter-collected data via telephone lines between the user's location and that of the provider. There are exceptions to the telephone-transmission-model, such as the method taught by Martin (U.S. Pat. No. 3,742,142; issued in 1973) wherein data transmission may be accomplished via "AC carrier lines or radio" in addition to telephone, and by Jahr et al. (U.S. Pat. No. 4,707,852; issued in 1987) which includes "coaxial cables" along with "public switched telephone networks" as transmission means. Also, the system disclosed by Blethen et al. (U.S. Pat. No. 3,937,890; issued in 1976) teaches a method of data transmission from the user's automatically reading meter to the provider's data-collection station via a cable television (CATV) connection. Nevertheless, a telephone connection is the common, nearly universally described means of data transmission, whether it involves a dedicated, single-purpose telephone line (for frequent or continuous data transmission) or general-purpose telephone lines intermittently seized for data transfer.

Regardless of transmission means, the two general types of remote automatic-meter-reading systems differ with respect to the nature of the action that initiates billing-data transfer. In one approach, this action is taken at the user's location and consists of the automatically reading meter initiating a coupling to the provider's data storage system and then dumps its data. In the other model, a polling signal generated at the provider's central location is transmitted to the user's metering equipment which, then sends its data back to the provider. Verma et al. (U.S. Pat. No. 4,833,618; issued in 1989) teaches an example of the former approach, wherein data transfer is initiated at the user's location. The Verma et al. system includes a microprocessor-controlled component coupled to the automatically reading meter at the user's location, this component being responsible for sua sponte initiating data transfer at pre-programmed times, e.g., once a month. The Verma et al. system employs a modem to seize the user's telephone line, to then dial—and establish the connection with With the—the provider's central location, and finally to effect the data transfer. Additionally, such a system must employ another modem at the provider's central location to answer the telephone call from the user's location and to establish a connection for receiving the data transferred from the user's location The microprocessor-controlled device at the user location in the Verma et al. system must incorporate sophisticated control circuitry and programming logic in order to format and/or encode the data for transmission, to provide security means to ensure the telephone connection is made to the correct provider system, to check and verify the integrity of the data to be transferred, to check and verify the successful transfer of the data, to repeat the transfer upon the occurrence of any of a number of possible transmission errors until a successful transfer is accomplished, and to log and document each successful periodic data transfer. Moreover, such a system must incorporate an additional device or computer program at the provider's central location to likewise detect and correct errors and validate the integrity of the transferred data, to identify the data source, to associate the received data with a particular user location, and to store the data. A requirement of such a system, whether explicit or implicit, must be the introduction of the data into the provider's billing system, the calculation of billing amounts according to the provider's proprietary schedule of rates, and the generation of invoices for distribution to the various users.

An example of the second general type of automatic-meter-reading system, wherein data transfer is initiated by an action at the provider's location, is taught by Spaulding (U.S. Pat. No. 4,004,097; issued in 1977). Functionally, the effective difference between the system of Spaulding and the user-location-initiated system discussed above is that the function of determining the legitimacy of the caller—i.e., in this case, that the call is properly originating from the provider—takes place at the user's location. Aside from that difference, however, it can be seen that in Spaulding and all the related prior-art require all of the same system components—microprocessor- or programming-controlled monitoring and validation devices, modems at both locations, storage devices at both locations, and the expressed or implied connection to a billing system—are just as necessary in the provider-initiated automatic-meter-reading systems as they are in user-initiated systems. In addition, Spaulding goes on to describe in detail the form of the data typically necessary in all such systems, as well as the process of formatting and encoding the data. It can be seen that such data records as must be prepared for transfer between the user's location and the provider's location must include at least, in addition to the encoded data itself, an identification-and-validation code related to the particular user, an identification-and-validation code related to the provider, time and/or date codes, and a mechanism for confirming data-integrity.

The obvious disadvantages inherent in prior-art remote automatic-meter-reading-and-billing systems lies with the plurality of specialized components required, the difficulty of integrating such a plurality of components into a single-function system, the difficulties presented by the need to coordinate activities at two separate locations, the complex data structure, the difficult task of validating the data record and its source, the difficult task of implementing security systems to prevent tampering and to ensure privacy. Additionally, as a result of such complexities and difficulties, and o the time and the repetition of tasks necessary to resolve them, usually making use of the user's existing ordinary telephone line, such systems have the additional drawback of customer inconvenience. Thus, for all of these reasons, such automatic-meter-reading systems have not found favor in the actual practices of commodity providers, and the traditional traveling meter reader remains the chief means of usage data collection, be it by a visual reading and hand-recording or by transfer of machine-readable data from the user-site device to a portable data collector carried by the meter reader.

It can be seen from examining the prior art related to automatically reading meters, and the automatic-meter-reading systems that have been proposed to use them, that the prior art has been fixated upon replicating in automation the paradigm of the traditional traveling meter reader, including all of the peripheral functions that had been necessary to support that institution. This has resulted in a retention in the semi-automated billing system of many of the expensive inefficiencies of the totally manual system. What is needed is a paradigm shift. More specifically, what is needed is a method of remote, automated accounting and billing for meterable commodities that dispenses with the transfer of actual meter readings, whether done by means of a meter reader or by automatic electronic transfer to the provider. What is also needed is such a method that makes use of installed and available metering equipment and also of existing automated billing services. What is yet further needed is suc a method that presents little or no inconvenience to the consumer of the commodities to which it is applied. Finally, what is needed is such a billing method that is applicable not only to the traditional metered commodities, but to a wide range of the continuously available, remotely generated commodities that are newly entering the market place.

SUMMARY OF THE INVENTION

It is an object of the present invention to supply a method of remote, automated accounting and billing for meterable commodities that dispenses with the transfer of actual meter readings, whether done by means of a meter reader or by automatic electronic transfer to the provider. It is a further object of the present invention to ensure that such method can make use of installed and available metering equipment and also of existing automated billing services. It is a yet further object of the present invention to supply such a method that presents little or no inconvenience to the consumer of the commodities with which the method is used. It is also an object of the present invention to supply such a method that is applicable not only to the traditional metered commodities, but to a wide range of the continuously available, remotely generated commodities that are newly entering the market place.

The method of the present invention achieves the objects set out above by eliminating and/or automating most of the functions of traveling meter readers and the costs associated with those functions, by eliminating and/or rendering unnecessary the need for the provider of such remotely delivered commodities to maintain a complex and expensive proprietary accounting and billing system, and by eliminating or greatly reducing the costs of data entry, data storage, data maintenance, and data validation associated therewith. Relatedly, the method of the present invention achieves the objects set out above by eliminating or substantially reducing the number of specialized components required for accounting and billing, thereby reducing or eliminating the problems inherent in the functional integration and operation of such systems. Finally, the method of the present invention has broad applicability such that it can make available to consumers of all commodities, such as entertainment and information, that are currently provided on an on-demand basis, the user convenience benefits currently available with respect to the continuously available commodities.

The method of the present invention is a new means of billing for remotely generated, remotely provided commodities, commodities such as the traditional "utilities"—electricity, natural gas, and water—but also including commodities such as entertainment- and sports-events, information, digitally stored art or music, digitally processed photographs, metered postage, highway tolls, and transportation tariffs. Persons familiar with the art will be able to add other examples to this list, which is not intended to be exhaustive. The various commodities to which the method of the present invention is applicable shall be referred to collectively as "commodities" and individually as, simply, "commodity."

As noted above, automatically reading meters, taught since at least 1966, have come into widespread use in connection with the traditional utilities. Furthermore, it is unarguable that the technology exists to apply such meters to other remotely generated or provided meterable commodities. The common useful features shared by such meters include the conversion of analog data—that is, the information that may be read visually from the meters' dials and gauges—into machine-readable data, such as audio, optical, or electronic pulses. A concomitant common feature is the storage of such machine-readable data for periodic reading by the provider. The reading of data is intended to be done remotely by a telephone call initiated either from the user's location or by the provider. In either case, the read data must then be analyzed by the provider in order to generate billing to the user, just the same as utility providers have done through generations of human meter readers. Although the method of the present invention relies on automatically reading meters for any meterable, remotely provided commodity, it differs completely from the meter-reader paradigm.

The method of the present invention in its simplest embodiment tracks the model that has been used for many years by the telephone companies to bill for information calls. Furthermore, in at least one manifestation, the method of the present invention uses the telephone company to bill for the commodity in question. (As used herein, "the telephone company" includes by implication not only wired telephone service, but also radio, cellular, and satellite telephone services.)

As most telephone company subscribers are aware, the local telephone companies now charge for calls for directory information (that is, for calls to a local number of 555-1212 and a long-distance number of 1-NNN-555-1212, where NNN represents any of the area codes within the North America). Unlike the traditional telephone company charges for individual telephone calls, the charge for a directory-information call is based neither on the length of the call nor the area to which the call is made. It is strictly on a per-call basis. Every time such a call is made from the telephone number of a particular customer, a unit charge is added to the customer's pending bill. More simply stated, the telephone company billing system tabulates the number of directory-information calls and, when the next bill is prepared, prints a line such as "M directory assistance calls: $ - - - "

where the charge is the tabulated number of calls times the unit charge for such calls. Typically, the charge for each call is $0.50 or $ 0.75, and, though not many telephone company subscribers are aware of it, this rate may be different for different subscribers—i.e., neighbors may be charged at different rates for use of the same commodity—according to each subscriber's particular billing plan. Thus, as far as billing goes, all the telephone company computer need know is that a telephone call from a particular subscriber's telephone to a number ending in 555-1212 has been connected.

The method of the present invention will be introduced by describing a simple embodiment of it applied to the billing for on-demand consumption of electric energy. In this embodiment, the method of the present invention requires (1) an automatically reading electric power meter (more accurately denoted "electric-energy-consumption meter") (2) a telephone line, and (3) a coupling device for connecting the two. The connection between the power meter and the coupling device is such that, for this example, every time a pre-determined unit of electric energy—say, 100 kilowatt-hours (kWh)—has been consumed, a signal travels from the power meter to the coupling device. The coupling device responds to this signal by using the electric energy user's telephone line to "dial up" a particular number owned by the electric energy supplier. Then, as soon as the dialed number connects, the coupling device breaks the connection—i.e., it "hangs up." In a truly McLuhanesque manner, the call was the message. Each time that such a call is made, the telephone company billing system (in this simple embodiment) will add a marker to the tally being maintained of electric energy consumption by the customer associated with the telephone account that placed the call. Then, at the end of the month, in addition to the telephone company charges billed to that customer, there will be an amount for electric energy consumption. That amount will be equal to the tally of calls made by the coupling device times a price for the electric energy unit in question. The latter of course is established by the electric power utility and communicated to the telephone company supplying the telephone service to the consumer's residence. The telephone company collects the electric-energy-consumption charge from its customer and forwards that sum, less its service fees, to the electricity provider.

It is noted that having the telephone company bill for items not sold by that company is nothing new. For example, the local telephone company bill will generally have charges for telephone services provided by companies not affiliated with the local company—e.g., for those services provided by long distance carriers. An even more relevant example is the billing by one's local telephone company for calls to "900-numbers." These numbers are now used to sell a wide range of services that can be provided over the telephone line. In addition to the notorious services such as "psychic hotlines," 900-numbers exist to give help with cross-word puzzles, software operation, and practically any type of information service. The common element of these diverse uses of 900-numbers is that a charge for calling one will appear on the local telephone bill of the telephone customer from whose phone the call was made. Generally, but not always, the charge for a particular call will depend upon the length of the call. In any event, the unit charge (per-call or per-call-minute is established by the company setting up the 900-number, to which the billing telephone company transfers the money received less a certain charge per call that the telephone company keeps. (It is noted in passing that 900-numbers are now used for the sale of goods that cannot be delivered directly over the telephone line, goods such as T-shirts, magazine subscriptions, and, theoretically, practically anything amenable to an agreement between the telephone company and the supplier of the goods, that is, the telephone subscriber with the particular 900-number.)

Thus, the method of the present invention is based on the fact that there already exist billing systems that can be used by providers of meterable commodities—the various customer-billing systems offered by the telephone companies. Yet another example of a use of this billing system that may be applied to meterable commodities within the method of the present invention is the standard 800-number service. Under this service, a third-party billing-service provider—or the commodity provider, itself—uses the billing data ordinarily provided by the telephone company for calls to the 800-number to identify the source of each "800 call" to the commodity provider such as a law office. The telephone number of that source can then be used by the telephone company or the commodity-provider to generate user billing based on the number of calls made by that user.

Persons familiar with communications network billing systems will be able to envision other services and capabilities of the telephone billing system that may be employed. Regardless of the particular manifestation, the association of automatically reading meters with the telephone companies' billing services by the method of the present invention establishes, on the one hand, a new approach to accounting and billing for providers of utilities and other meterable commodities and, on the other hand, a new medium—the telephone billing record—for recording accounting and usage data.

Thus, the method of the present invention incorporates functions for 1) locally monitoring commodity meters with respect to the consumption by the commodity user of manageable and convenient billing units of the commodity (Monitoring), 2) directly or indirectly notifying a billing service of the consumption of a billing unit using an existing telecommunications network (Notification), and 3) the billing service then economically generating customer billing and providing both the commodity provider and the user with accounting information and the provider with collection services (Accounting).

With respect to a particular commodity, the commodity provider chooses a convenient and desirable Billing Unit, in units of currency. The Billing Unit may be related directly to a particular quantity of the commodity, such as the cost of 100 kWh of electricity or of 100 cubic feet of natural gas, or it may be a tally of cost of the accumulated consumption by the user of several variously priced units, or of variably priced units, of the commodity. For example, in many areas, the cost of electric energy is tied to the time of day during which it is consumed, wherein each time-of-use period carries a different billing rate per unit. Alternatively, the rate paid by industrial and large commercial users of such utilities typically varies according to the varying periodic level of demand for the commodity by each user. Under such circumstances the determination of the Billing Unit may be more complicated than simply multiplying the number of units of the commodity consumed by the price established for each unit, and it may be found under these circumstances that the telephone call made by the coupling unit would take place each time that the automatically reading meter determine that a Billing Unit's worth of the utility commodity had been consumed Alternatively, the calculation of various or variable rates may still be done within the telephone billing system, as described below. In any case, the user will periodically consume units of the commodity equal to the Billing Unit.

Within the method of the present invention, a number of variants exist by which the cost of the commodity consumed is automatically tallied. Generally speaking, the provider then chooses a Telephone Service, acquires a Telephone Number—or several Telephone Numbers, each associates with a different billing rate—with which the Billing Unit is associated, and sets a Billing Period. The Billing Period, dependent upon the Telephone Service, is usually monthly, but it may be any convenient period. The currency value set for the Billing Unit may include service fees related to the cost of the Telephone Service, maintenance of the Telephone Number, and toll charges for calls to the Telephone Number.

Because the Accounting function of the Method—i.e., the counting and tallying of commodity usage—occurs only at the time that a Billing Unit is seen to have been reached, the Billing Unit chosen is set large enough so that the Accounting function will not be triggered too frequently during the Billing Period. On the other hand, because the Billing Unit is a non-increment accumulated cost for the consumption of a number of commodity units, it follows that some portion of the Billing Unit will be unaccounted for at the end of each Billing Period, and will be carried over into the next Billing Period. Thus, the Billing Unit chosen should be small enough so that any large fluctuations in the periodic bill for any Billing Period will not be attributable to any carried-over portion of the Billing Unit. In this way the user is protected from unpredictable variations in billing, and the provider is protected from undue delay in the collection of revenues due on the delivered commodity. If the Billing Period is monthly, the preferred frequency for triggering the Accounting function is at least no more than daily.

The parameters of the method contained in the Billing Unit, the Telephone Service, the Telephone Number, and the Billing Period having been set, the commodity meter, through the device coupling it to the telephone line triggers a Notification function that causes the one Billing Unit to be charged on the users telephone bill each time that it records an additional Billing Unit having been consumed. As indicated, this may be effected by causing the user's telephone to call any one of a set of Telephone Numbers, depending on the unit cost of the commodity consumed (which in turn can depend on a number of variables, including in particular the time of day at which it was consumed). Alternatively, a given user's phone will always connect to the same Telephone Number, with the receiving computer set to note the time of day that the call is made and the other elements that establish billing rate for that particular user (who shall be identified by the user number from which the call is received). The function providing that information is the Monitoring function.

The Monitoring function may be carried out by a variety of well-known, established means. Some existing microprocessor-controlled automatically reading meters can be programmed to monitor and signal accumulated use in addition to, or instead of, incremental use. Alternatively, employing one or more existing technologies, a Monitoring function can be incorporated into, or connected to, any existing commodity meter, or can be designed into new meters, to monitor and signal use of a quantity or quantities of the commodity equal to the predetermined Billing Unit. Additionally, while such a Monitoring function may be implemented to monitor gross usage of the commodity sold at a single rate, it may just as well be implemented in existing automatically reading meters, or by means existing technologies, to monitor two or more distinct kinds of usages, differentiated by such qualities as the application of the usage or the time of the usage, and to provide different or separate signals to the coupling device connected to the telephone when each differentiated usage equals the Billing Unit. For instance, a common instance of such differentiation of use is evident in commonly employed electric meters that measure and store information about electricity usage during two (typically "peak" and "off-peak") or more time-of-use periods.

In any case, although the automatically reading meter continues to store information about the accumulated incremental use of the commodity being metered, information about the Billing Unit is not stored by the meter, by the Monitoring function, or anywhere at the user location. Thus, no additional memory device or data-storage means is required by the method of the present invention; the Monitoring function either passively awaits a predetermined signal from the automatically reading meter indicating the accumulation of a Billing Unit of consumption, or it periodically reads the automatically reading meter's memory, its dials, or other data storage for the existence of a predetermined condition that indicates the accumulation of a Billing Unit of consumption.

Upon recognition of the use of a Billing Unit of the commodity, the Monitoring function triggers Notification of the Telephone Service. The Notification function of the method is carried out using the existing telephone system by means of a telephone dialer or other such means. (Although a simple dialer with no intervention of modem is envisioned for the Preferred Embodiment, the use of a modem is not ruled out to the extent that a modem can be used in some embodiment of the present invention.) Notification includes the tasks of dialing the Telephone Number, ensuring that a connection has been made, and hanging up. In the event that two or more differentiated uses of the commodity are being monitored, as described above, then two or more different Telephone Numbers may be designated to provide information to the Accounting function about the differentiated uses.

Notification preferably employs the user's existing telephone line; alternatively it may use a dedicated telephone line. Existing telephone dialers and modems customarily react to the change in telephone line potential that is indicative of a completed connection and return a "connected" signal and, thus, may be employed in this function at the user's location. Notification does not require an acknowledgment signal or any reciprocal signal to be returned from the provider's Telephone Number, nor does the method of the present invention require any other communication or transfer of data between the user and the provider. Thus, any existing device capable of "answering" a telephone line, such as a simple answering machine or an ordinary modem having an auto-answer feature, may be employed at the provider's location or elsewhere to answer when the Telephone Number is called. Alternatively, it is within the capabilities of communications network engineering to provide for telephone numbers that do not have to be "answered" at all outside of the switching equipment of the telephone companies, so that the provider might not need to provide for an answering mechanism.

Subsequent to the telephone connection being made between the user's telephone account and the Telephone Number, the Notification function disconnects without any data transfer or other communication having occurred. The period of time between the establishment of the user-to-Telephone-Number connection and the Notification function terminating the call will be the minimum time—generally a fraction of a second—required by the Telephone Service administering the provider's Telephone Number to record the call as having been made. Termination may be effected al the user end of the connection, at the provider end of the connection, or within the Telephone Service. Thus, where the user's existing telephone line is used after being "seized" by the Notification function, the inconvenience to the user that is inherent in prior-art automatic-meter-reading methods—inconvenience related to the time it takes for call authentication, data transmission, and data verification to transpire—is overcome because of the negligible duration of such calls.

Further, the elimination by the method of the present invention of all data transmission between the user and the provider overcomes the failings inherent in the prior art related to data encoding, data security, data validation, source validation, and data decoding, failings that have prevented automatic meter-reading from being accepted within the meterable commodities industries Further still, the present invention eliminates the costs to the provider, inherent in prior-art methods, of keeping in place elaborate and expensive data handling equipment, systems, and personnel.

As an example of the flexibility of the basic method of the present invention, consider two ways in which the time-of-use billing can be implemented for different categories of users. The basic charge level is assigned to telephone number from which the particular user's calls are made to the Telephone Company. To build into this system the ability to further differentiate as a function of the time of day that power is consumed, the user's meter can be designed to have two (or more) tracks associated with, for example, Peak-Time and Off-Peak-Time usage. The system is further designed that when the Peak-Time track has recorded another increment of usage (in terms of electric energy consumed), the meter will initiate the call to the Telephone Company, but to a different number (the Peak-Time Telephone Number) than will the be the case when the meter's Off-Peak-Time track has accumulated an increment of usage. This approach has the advantage that changes in the charge differential between the Peak-Time and Off-Peak-Time usage can be adjusted at the central office, as opposed to having to be done at each meter under the following variant on the method. In an alternative embodiment of the method as applied to time-of-use billing, the individual tracks referenced above could be set to measure cost increments rather than commodity increments. For example, if Peak-Time usage was charged at a rate 1.25 that of Off-Peak-Time usage, the Peak-Time track would record a increment in cost for 80% of the commodity usage of the Peak-Time track, and then would initiate a call to the Telephone Company. The advantage of this approach is that the two tracks of the meter could initiate calls to the same Telephone Number at the Telephone Company, the Peak/Off-Peak cost differentiation having been taken care of at the meter rather than at the Telephone Company. For this approach to be economical, the Peak/Off-Peak commodity-usage charge ratio would not be able to change; once it did, all of the meters would have to be reset. A third variant on handling the time-of-usage charge differential would be to define the incremental unit of usage so small that frequent calls would have to be made to the Telephone Number, frequent enough so that the time of day that the calls were made would bear a close relation to the time of day at which the commodity was consumed. This variant could use a single-track meter and a single Telephone Number.

The Notification function may be supplemented by an Enforcement function, and such a function is preferred under the method of the present invention where the seizure of the user's existing telephone line is employed instead of a dedicated telephone line. The Enforcement function ensures the accomplishment of the Notification function by periodically repeating the attempt to seize the user's telephone line, if it is found to be in use at a given seizure attempt, and also by repeating the dialing of the Telephone Number until a successful connection between the user and the Telephone Number has been made. Many devices exist that may be employed to accomplish the Enforcement function, such as devices to accomplish scheduled "polling" functions that are commonly employed in facsimile (fax) machines and fax software.

Thus, the Notification and Enforcement functions achieve the object of allowing the provider to greatly reduce the number of meter readers who now travel to each user location during each Billing Period and the high overhead cost associated with such tasks. The function of such meter readers as would need to be retained would be only to take initial and account-terminating readings and to occasionally verify readings relative to disputed accounts.

The Accounting function includes the tasks of billing and collection, relative to the user, and of reporting and payment, relative to the provider, for on-going use of the commodity by users having accounts with the provider. The Accounting function does not include the tasks of establishing and terminating user accounts, nor of analyzing usage data, nor of the apportionment of usage to generation sources, as has been recently required by deregulation of utilities in some places. However, the Accounting function provides data for analysis and apportionment, and for terminating and establishing user accounts.

Billing and collection, relative to the user, are inherent in the Telephone Service as these services are offered and administered by telephone companies. Charges for use of the commodity, measured in Billing Units, appear on the user's phone bill as itemized charges resulting from calls to the Telephone Number. Preferably, these charges appear as individual line items for each call, each line-item charge being time- and date-related, in order to give the user a basis for checking usage and demand information; this capability for itemizing and time- and date-relating such individual calls is also inherent in such Telephone Services as the method employs—as demonstrated by the commonly practiced billing for 900-number calls related above. The user pays for commodity use, therefore, by paying the telephone bill. Thus, the provider dispenses with the personnel-intensive tasks of periodic billing and collection of current accounts. Collection personnel and systems can then be left to the collection of the relatively small number of seriously delinquent or disputed accounts, and for occasionally resolving terminated accounts. The resulting reduction of the provider's billing- and collection-related overhead can be very large.

Call itemization and the subsumed time- and date-relationship compilations inherent in the Telephone Service also provide the Accounting function with data sufficient to implement variable-rate billing based on such easily determinable factors as demand level, frequency of use, or quantity-per-period usage. Additionally, the Accounting function may be programmed to bill each call at a rate dependent on the identified calling telephone number, so that different users—i.e., users with different credit ratings, or residential, commercial, and industrial users—can be billed at different rates for the same quantity of the commodity. It is well within the capabilities of software engineering to provide for algorithms in the billing system of the Telephone Service to calculate variable rates based on any set of determinable factors that may be supplied to the Accounting function by the method of the present invention, and to assign varied rates to calls according to the telephone numbers from which the call originated. Such commonly employed billing practices and capabilities can be seen in the billing by telephone companies for many variable-rate "calling plans."

The reporting and payment tasks relative to the provider are also inherent in the Telephone Service as these services are offered and administered by telephone companies. As funds billed on the user's telephone bill are paid, they are paid in turn to the provider. At the same time, accounting for charges billed and pending, charges collected, and disputed charges, appear on the provider's Telephone Service statement. Payment transfer from the Telephone Service to the provider is preferably accomplished using the existing electronic funds transfer services of banking institutions. Reporting of usage and collection information to the provider is preferably made at the end of each Billing Period in machine-readable form using either transportable media, such as computer tape or CD-ROMs, or bulk data transmission (by the Telephone Service) or retrieval (by the provider). Delivery of the data in this form allows the provider to easily perform further computer analysis of the data and thus draw conclusions useful in the operation and administration of the commodity propagation and distribution system.

The description of the Preferred Embodiment of the invention in relation to the drawings that follow discloses the application of the present invention to an exemplar remotely metered, continuously available commodity. It must be kept in mind, however, that the method of the present invention may be applied to all commodities described above as continuously available commodities or as on-demand commodities It must also be kept in mind that it is inherent in the present invention that the method may be—and in many cases should be—applied simultaneously to several such commodities.

REFERRED EMBODIMENT OF THE INVENTION

The Preferred Embodiment of the present invention is a method directed at billing for electric energy consumption by means of the telephone company local to the residence of the consumer. As will be seen, the method described will work equally well with any of the other traditional metered utilities.

Figure 1:
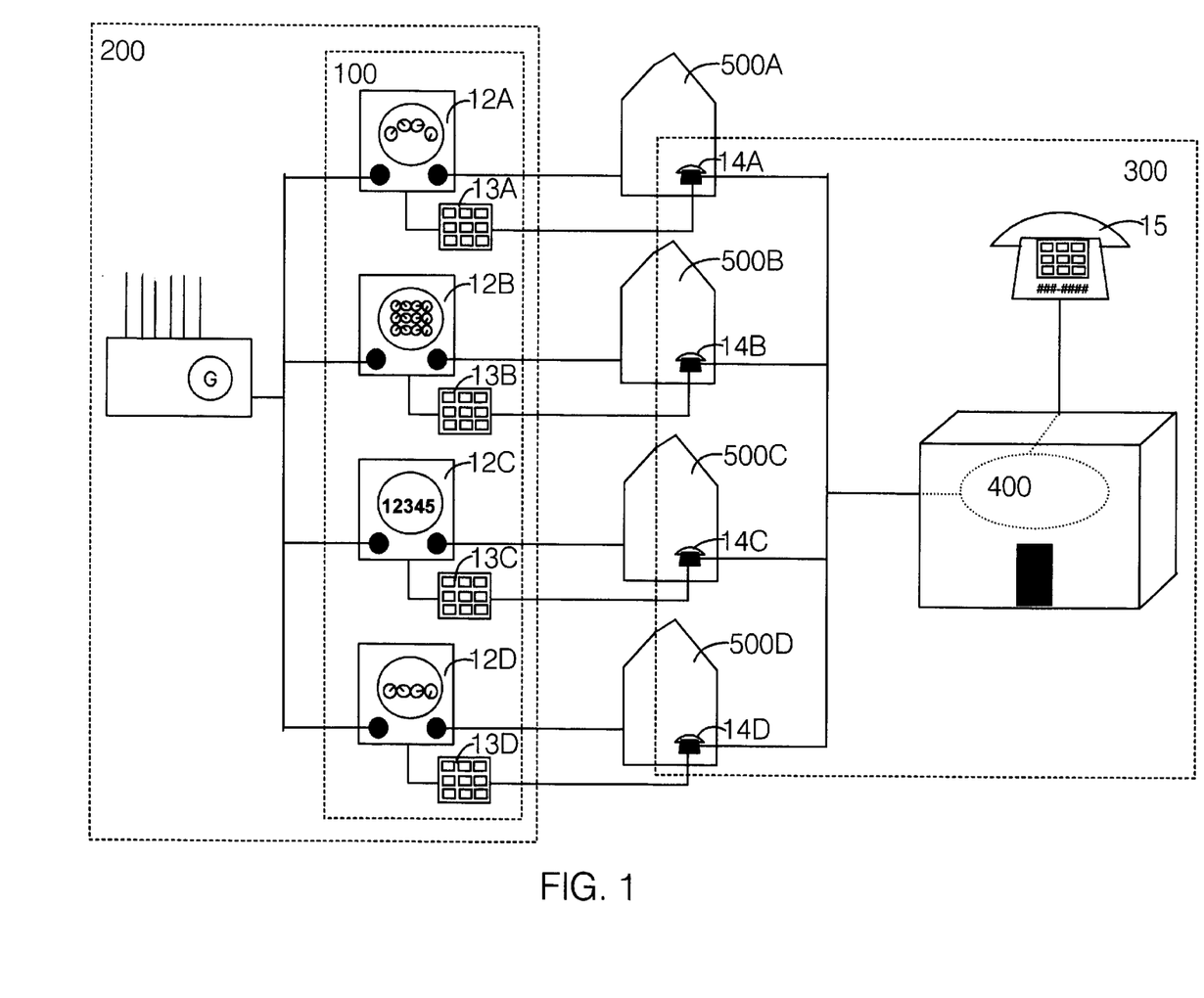
FIG. 1 is a schematic of the control elements involved in the implementation of the method of the present invention, depicting a sample network of commodity users.

As is shown in FIG. 1, the Preferred Embodiment of the present invention uses an array of meters 100 to monitor the use of electric energy at the various sites throughout the commodity distribution system 200 where the electricity is actually used. The array of meters 100 includes a plurality of meters 12A . . . 12D for metering the consumption of electricity by various commodity users 500A . . . 500D. Each respective one of the meters 12A . . . 12D is connected with a corresponding coupling device 13A . . . 13D. Each one of the coupling devices 13A . . . 13D is, in turn, connected with a respective telephone line 14A . . . 14D of the particular user 500A . . . 500D. Assuming that all of the respective commodity users 500A . . . 500D is paying the same rate for electricity, then a particular billing telephone number 15 is associated with each of the respective users 500A . . . 500D and the corresponding coupling device 13A . . . 13D will initiate a telephone connection between the respective lines 14A . . . 14D and the particular billing telephone number 15 via a telephone service provider(TSP) or a telephone company 400. The TSP, shown here simply by way of example as a single provider for all of the users 500A . . . 500D, may of course, be any number of providers, the provider is being chosen by individual commodity users 500A . . . 500D, as is already the practice today. This distribution system is maintained by a commodity provider 7. Although the functions of electricity-generating and electricity-distribution, respectively, are now being split in many parts of the U.S., nothing is lost in this discussion by continuing to refer to the entities providing these two services as a single commodity provider 7.

Figure 2:
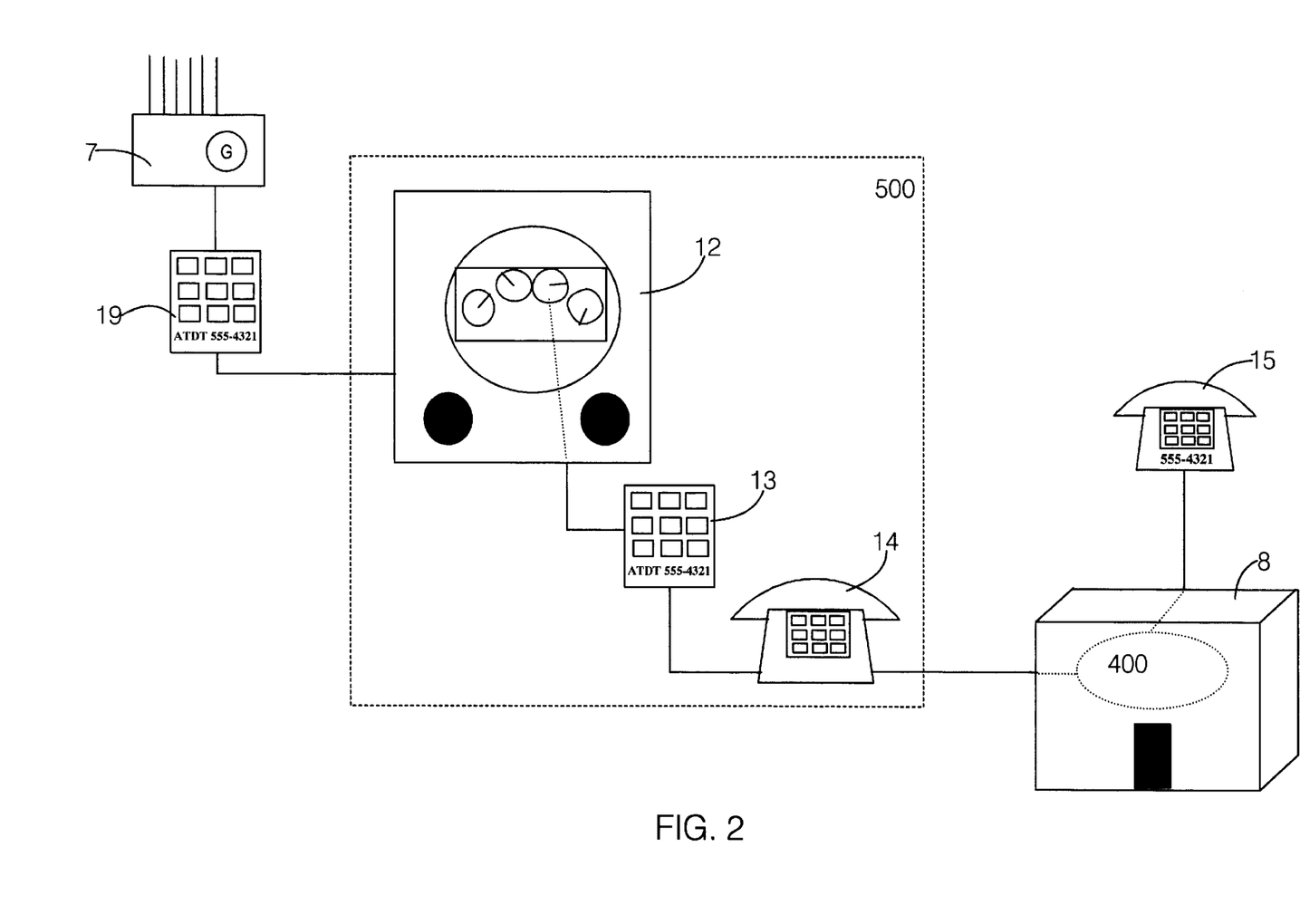
FIG. 2 is a block diagram illustrating the Preferred Embodiment of the method of the present invention applied to the billing for electricity use showing how the method is carried out with respect to a typical user.

FIG. 2 shows the setup at a particular electricity consumer site. Here, a meter 12 is representative of each of the electric power meters of the array of meters 100. The meter 12 measures the electric energy use by a particular individual user 500, be it a residential, industrial, commercial, or organizational user. In the preferred Embodiment, the meter 12 is basically of the automatically reading type of meter now well-known in the industry. One essential feature of the meter 12 is that, each time a pre-determined unit of electric energy has been consumed by the user 500, the meter 12 generates an incremental signal, typically in the form of an electric pulse. The meter 12 is coupled to the user's telephone line 14 through a coupling device 13. The coupling device 13 may allow the meter to be polled by the commodity provider 7. However, the key feature of the coupling device 13 in the Preferred Embodiment of the billing method of the present invention is that each time the predetermined unit of electricity has been consumed by the user 500 and the consequent electric pulse generated by the meter 12 and transmitted to the coupling device 13, the coupling device 13 places the call to a particular telephone number 15 assigned to the commodity provider 7 and maintained by the local telephone company 400. The telephone number 15 called by the user 500 is one assigned to the billing rate, or billing rate plan, of the commodity provider 7 related to the user 500. Once such call is "connected," the coupling device 13 disconnects. In the Preferred Embodiment of the invention, this call, made within a telephone communications system maintained by the telephone company 400, goes "nowhere." However, the telephone company 400 records the fact that such a call has been made from the site of user 500, in the same way that it would record the fact of a directory-information call having been made from a particular phone number. Although only the setup at a particular user 500 is described, similar elements are present at each of the array of meters 100. Each user's telephone line 14 that is provided by the telephone company 400 is provided to a particular telephone customer who is also a particular user of the electric energy provided by the commodity provider 7.

In the Preferred Embodiment of the present invention, the telephone company 400 administers a telephone billing system through which the telephone company 400 bills its customers for all telephone calls made using the telecommunication path it provides. Through prior agreement with the commodity provider 7, the telephone company 400 ensures that each call made from the telephone line 14 of the user 500 to the telephone number 15 of the commodity provider 7, a charge for each such call corresponding to the amount that the commodity provider 7 charges to the user 500 for the unit of electricity corresponding to each call, and a total amount for all such calls are entered into the billing system and appear on the telephone bill of the user 500 as a charge for electric energy usage. Preferably, the amount of this item will also include the service charges of the telephone company 400 for providing this billing service to the commodity provider 7, though this amount may not appear explicitly on the telephone bill of the user 500. The charges are collected when the individual user 500 pays the telephone bill. The collected charges, less the service fees of the telephone company 400, are then passed on to the commodity provider 7 preferably electronic funds transfer. At the same time, information identifying the individual user 500 who was billed for the charges, and specifying the individual dates, times, and rates charged, relative to the calls from the individual user 500 to the telephone number 15, is transmitted to the commodity provider 7 in digital form suitable for storage and further analysis. The means of identifying the caller is an administrative matter of linking the caller's telephone number with the electricity service account at the caller's location.

Restated, with reference to FIG. 1 and FIG. 2, the commodity provider 7 arranges with the telephone company 400 for the provision of the telephone number 15 and, the imposition of a certain unit charge per call for calls made to the telephone number 15 by a particular user 500. The unit charge per call is determined by the commodity provider 7 with respect to the use of a predetermined quantity, a predetermined accumulation of quantities, or a predetermined quantity of a particular type or usage, of the electricity it provides. To determine the unit charge per call, the commodity provider 7 sets a base price for a particular predetermined quantity, predetermined accumulation of quantities, or predetermined quantity of a particular type or usage, of its electricity, incorporating into the price the fees charged by the telephone company 400 for its provision and maintenance of the telephone number and its billing services, the resulting price being commensurate with whatever regulatory restrictions apply to the commodity provider 7. Each time the meter 12 at the location of the user 500 records usage of the predetermined quantity, predetermined accumulation of quantities, or predetermined quantity of a particular type or usage, of electricity, the meter 12 causes the coupling device 13 to seize the telephone line 14 or the user 500 and connect it to the telephone number 15. Information—including the date, time, and related charge—about each such call, along with the total charge for all such calls made during the telephone billing period, appears on the telephone bill of the user 500 as charge for electricity usage. The user 500 then pays its electric bill by paying its telephone bill. Concurrently, each telephone billing period, the telephone company 400 notifies the commodity provider 7 about the electricity consumed by the user 500 and billed by the telephone company 400 by supplying the same information. The commodity provider 7 then uses this information for such functions as analysis of usage and distribution of funds. Finally, as funds are collected by the telephone company 400, they are transferred to the commodity provider 7, except that the services charges of the telephone company 400 are retained by them.

In a further development of the Preferred Embodiment, the commodity provider has a supplier coupling device 19 connected on one side with a commodity supplier telephone line and on the other side with the meter 12. The meter 12 includes circuit means that can be controlled by the supplier coupling device 19. This second coupling device 19 can then be used by the supplier to change the billing rate charged to the user 500 for the particular commodity.

Although this Preferred Embodiment has been discussed in terms of a method for billing electric energy usage and then in connection with a relatively straightforward billing through the local telephone company, many other embodiments of the method of the present invention can be envisioned. These other embodiments may be applied to the billing for other traditional utility/commodities or for the billing of the new remotely supplied commodities alluded to in the SUMMARY. Furthermore, those other embodiments can be directed at billing systems, that, though tracking those used by the telephone companies in billing its customers for services provided by third parties, are physically located and managed by the third-party providers themselves.

I claim:

1. A method of automatic billing for consumption of a commodity provided on an on-demand basis by a commodity supplier to a user remote from said supplier, wherein a metering device is provided for measuring a consumption of said commodity and a coupling device is connected to said metering device, and wherein a connection to a billing service, using telecommunications services of a telephone service provider, is initiated by said coupling device, said method comprising the steps of:

a. defining a billing unit of a commodity and a billing value for said billing unit, wherein said billing unit is a quantity of commodity consumed;

b. defining a user telephone number that identifies a particular user;

c. defining a billing telephone number that represents said billing value that is applied to said billing unit for each instance a connection is made between said user telephone number and said billing telephone number;

d. monitoring a metering device for consumption of said billing unit of said commodity;

e. notifying a billing service of said consumption of one said billing unit of said commodity by establishing a connection between said user telephone number and said billing telephone number, wherein said telephone service provider sets a flag for each instance said connection is made; and f. generating a user invoice for said consumption of said commodity by tallying each said flag to obtain an invoice tally that is equivalent to a total billing amount for all instances said connection was established.

2. The method of automatic billing of claim 1, said step of notifying said billing service further comprising the steps of:

a. sending a billing unit consumption signal upon consumption of one complete billing unit from said metering device to said coupling device;

b. making a connection between said user telephone number and said billing telephone number;

c. determining that said connection is successfully established between said user telephone number and said billing telephone number and then immediately breaking said connection, wherein a transfer of data other than said setting of said flag by said telephone service provider expressly does not take place before said connection is disconnected.

3. The method of automatic billing of claim 1, said step of generating said user invoice further comprising the steps of:

a. determining a billing period;

b. tallying each said flag set during said billing period to obtain said invoice tally for said billing period; and c. generating an invoice for a commodity billing amount that includes at least said invoice tally for said billing period.

4. The method of automatic billing of claim 3, wherein said flag set for said connection between a particular user telephone number and a particular billing telephone number represents a particular monetary value, and wherein said commodity billing amount is determined by summing said flags to obtain said invoice tally, expressly without need of any conversion of said invoice tally from a quantity to a monetary value.

5. The method of automatic billing of claim 3, wherein said billing service is notified only when a complete billing unit is consumed.

6. The method of automatic billing of claim 1, wherein said step of determining said billing unit of said commodity includes:

a. determining a plurality of commodities to be included in said automatic billing method;

b. determining a specific billing unit for each one of said plurality of commodities;

c. associating a particular billing telephone number with each respective one of said specific billing units included in said plurality of commodities; and d. providing a connection from each respective one of said metering devices of said plurality of commodities to said coupling device.

7. The method of automatic billing of claim 6, wherein said step of determining a specific billing unit includes determining differentiated uses for a particular commodity.

8. The method of automatic billing of claim 7, wherein said step of determining differentiated uses includes the steps of:
 a. determining at least two time-of-day uses including a peak-time of consumption and an off-peak time of consumption;
 b. associating identical billing units with each of said time-of-day uses;
 c. associating a particular time-of-day billing value with each respective one of said time-of-day uses; and
 d. associating a different billing telephone number with each respective one of said billing units for said at least two time-of-day uses of said particular commodity.

9. The method of automatic billing of claim 7, wherein said step of determining differentiated uses includes the steps of:
 a. determining at least two time-of-day uses including a peak-time of consumption and an off-peak time of consumption;
 b. defining a different billing unit for each one of said at least two time-of-day uses; and
 c. associating an identical billing value with each said billing unit of said respective time-of-day uses; and
 d. associating a single billing telephone number with each one of said billing units for said at least two time-of-day uses of said particular commodity.

10. The method of automatic billing of claim 7, wherein said step of determining differentiated uses includes the steps of:
 a. determining at least two time-of-day uses including a peak-time of consumption and an off-peak time of consumption;
 b. associating an identical billing unit with each one of said at least two time-of-day uses;
 c. recording said time-of-day by said telephone service provider for each instance of said connection between said user telephone number and said billing telephone number, along with said flag; and
 d. defining said identical billing unit sufficiently small such that said connection between said user telephone number and said billing telephone number is initiated frequently enough to provide sufficiently accurate time-of-day information to said billing service.

11. The method of automatic billing of claim 6, wherein said step c includes providing a plurality of coupling devices, one for each respective one of said metering devices, and wherein said step d includes providing a connection from each one of said respective metering devices to a respective one of said plurality of coupling devices.

12. The method of automatic billing of claim 3, wherein a telephone service provider provides an invoice for telephone services to said user, and wherein said step of generating said user invoice includes the step of including said commodity billing amount on said invoice for telephone services provided by said telephone service provider.

13. The method of automatic billing of claim 3, wherein said step of generating said user invoice includes forwarding said commodity billing amount from said telephone service provider that provides telephone services to said user to said commodity provider, wherein said commodity provider generates said user invoice.

14. The method of automatic billing of claim 1, wherein said commodity is electric energy, said metering device is an automatically reading electric power meter, and wherein said unit consumption signal is a discrete signal emitted by said meter each time said billing unit of electric energy has been consumed.

15. The method of automatic billing of claim 14, wherein a monetary value is associated with said consumption of said electric energy and said unit consumption signal is sent to said coupling device each time that a predetermined billing unit value of said electric energy has been consumed.

16. The method of automatic billing of claim 8, wherein said step of determining at least two time-of-day uses includes providing a metering device that has multiple recording means.

17. The method of automatic billing of claim 16, wherein said multiple recording means includes recording consumption associated with a time-of-day consumption that differentiates between at least two consumption billing rates for two respective billing units, a Peak-Time consumption billing rate for consumption of a Peak-Time billing unit and an Off-Peak-Time consumption billing rate for consumption of an Off-Peak-Time billing unit, wherein a Peak-Time consumption is recorded in a first recording means and an Off-Peak Time consumption is recorded in a second recording means, said step of determining a billing unit of said commodity including determining a first monetary value for a Peak Time billing unit and a second monetary value for an Off-Peak Time billing unit, and wherein said step of notifying said billing service includes sending respectively a first unit consumption signal to said coupling device upon consumption of said Peak-Time billing unit and a second unit consumption signal to said coupling device upon consumption of said Off-Peak-Time billing unit.

18. The method of automatic billing of claim 16, wherein a first billing telephone number is allocated to said Peak-Time billing unit and a second billing telephone number is allocated to said Off-Peak-Time billing unit, and said telephone connection with said first billing telephone number notifies said billing service of consumption of one billing unit of said commodity at a Peak-Time billing rate and said telephone connection with said second billing telephone number notifies said billing service of consumption of one billing unit of said commodity at an Off-Peak-Time billing rate.

19. The method of automatic billing of claim 17, wherein said billing unit is 100kWh.

20. The method of automatic billing of claim 19, wherein said billing unit is determined by a billing rate per 100 kWh of consumption.

21. The method of automatic billing of claim 1, wherein said coupling device connected to said metering device is a first coupling device connected between said metering device and said user telephone line and wherein a second coupling device is connected between said supplier and said metering device, and said supplier has access to said second coupling device via a supplier telephone line, wherein said method includes the step of said supplier adjusting said billing rate by controlling said second coupling device via said supplier telephone line.

22. The method of automatic billing of claim 1, wherein said connection is a telephone connection and wherein each time said metering device generates said unit consumption signal, said coupling device initiates a telephone call between said user telephone number and said billing telephone number.

* * * * *